J. F. POND.
Improvement in Revolving-Disk Harrows.

No. 114,707.  
Patented May 9, 1871.

WITNESSES.  
Alfred Elwell  
J. J. Elwell

INVENTOR.  
Joseph F. Pond

United States Patent Office.

JOSEPH F. POND, OF CLEVELAND, OHIO.

Letters Patent No. 114,707, dated May 9, 1871.

---

IMPROVEMENT IN REVOLVING-DISK HARROWS.

---

The Schedule referred to in these Letters Patent and making part of the same.

---

*To all whom it may concern:*

Be it known that I, JOSEPH F. POND, of the city of Cleveland, in the county of Cuyahoga and State of Ohio, have invented certain new and useful Improvements in Revolving-Disk Harrows and Disk Cultivators; and the following is a description of the same, reference being had to the accompanying drawing making a part of this specification, in which—

Figure 1 represents a perspective view of harrow with thills attached.

Figure 2 also represents a perspective view of harrow with pole attached.

My invention consists—

Figure 1:
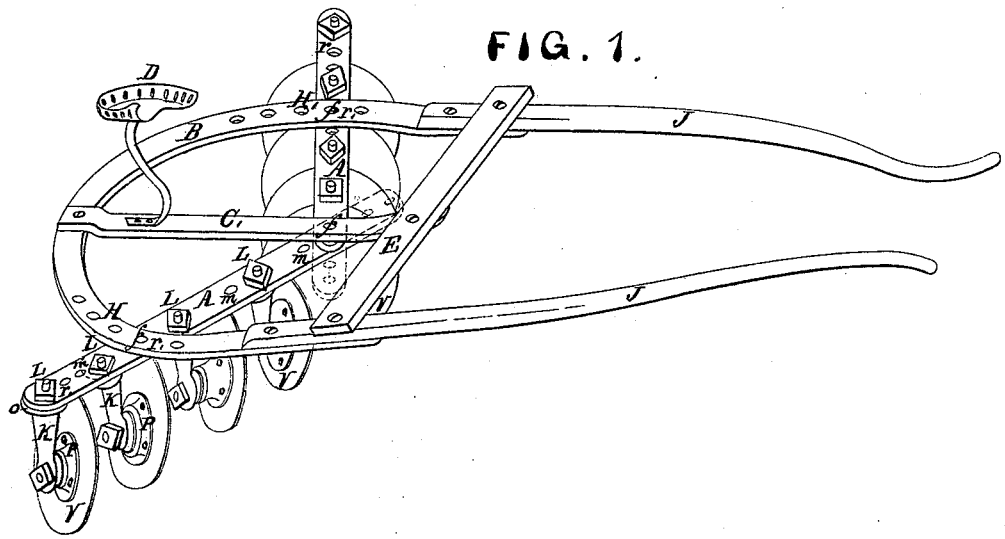

First, in the application and use of thills or pole to revolving-disk harrows.

Second, of a revolving-disk harrow or cultivator composed of metal and wood, or either, to which thills or pole are attached for the purpose of guiding the same more easily and keeping the harrow in a more direct line with the line of draft, which will prevent the lateral motion caused by the oblique position of the disks and be more easily turned around, which can then be used for cultivating or harrowing.

It further consists in arranging the holes in the disk-bars so that disk-supporter may be changed from one position to another to throw the earth out or in, and also allow the disk-bars to be shortened or taken up toward the center of the implement.

It further consists in constructing the disk-supporter with a coupling-joint, so that the disk may be firmly secured at any desired position or angle.

It also consists in constructing the hub of the disk in such a manner that dust or grit cannot enter the hub and prevent the easy action of the disk.

It also consists in constructing the hub in such a manner that bolts and nuts can be dispensed with at the small or outer end of the hub to keep the disk on the cone-shaped axle or arm, so that a friction-washer and yielding collar can be applied to prevent dust from entering the hub.

It further consists in constructing the hub with a recess, into which packing may be placed for the purpose of preventing the oil from escaping between the hub and disk-plate.

To enable others skilled in the art to make and use my invention I will describe it, referring to the drawing and letters marked thereon.

The harrow-frame is composed of metal and wood, and may be composed of either.

It has two disk-bars, A A, semicircular adjustable bar B, center or draft-bar C to which a spring-seat, D, is attached, and cross-bar E, which are held together by bolts F.

The semicircular bar B has thills attached to the front end, which projects forward of the disk-bars A A.

The semicircular bar B is provided with a series of holes, H H, so that the disk-bars A A may be moved forward or backward to give more or less width, or change the angle of the disks with the line of draft without changing each disk separately.

The pole I or thills J J are a much-needed device to revolving-disk harrows, as they prevent the lateral motion caused by disks placed or running obliquely to the line of motion.

Figure 2:
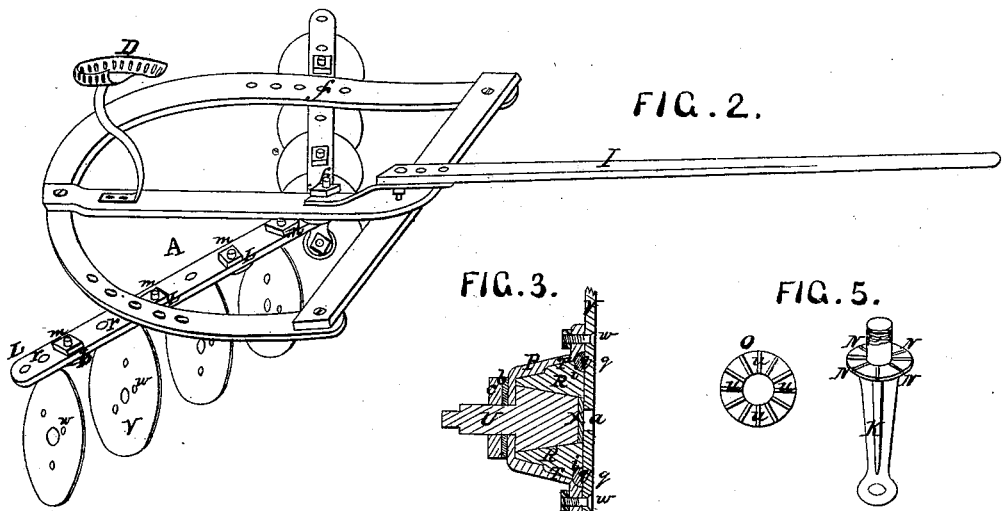
Figure 3:
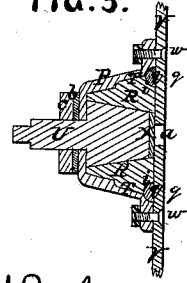
Figure 3 is a sectional view of disk complete.
Figure 5:
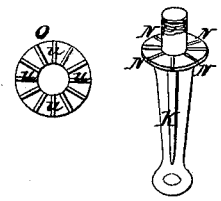
Figure 5 is a top or plan view of an adjustable disk-supporter.
Figure 4:
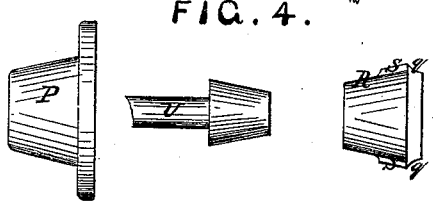
Figure 4 is a plan view of hub, axle, and cone-box.

The disk-bars A A are provided with a series of holes so arranged that the disk-supporters K K may be changed, as shown in drawing, fig. 2.

When the disk-supporters are secured in holes L L, as shown in fig. 1, the earth is thrown toward the center of the harrow; but when the disk-supporters K are secured in holes $m$ $m$, and the front edge of the disks are turned obliquely toward the center of the harrow, the earth will then be thrown out from the center, as shown in fig. 2.

If the disk-supporters were to remain in holes L L and merely changed half around the two disks near the center of the harrow would be so far apart that there would be a portion of earth sixteen or eighteen inches in width that would not be moved or operated upon; but changing the disk-supporters as shown in fig. 2, and turning the front edge of the disks together obliquely to the line of motion, the earth will then be removed from the center.

The disk-supporters are provided with small projections N N on the upper end or shoulder which mesh into grooves or notches $n$ on the under side of the coupling-joint plate O. By this device the disk-supporter may be changed from one notch to another for the purpose of changing the angle or position of the disk, and also prevent the disk from turning and make the disk more secure.

The hub P is provided with an inner box, R, which has projections S S on the outside, which fit into recesses T T in the hub P, which prevent the box R from turning in the hub P.

The hub P has an opening at the small end, through which the axle or shaft U is placed, and then the conical box R is placed in the hub around the axle U, which forms the bearing surface for the disk to revolve upon.

The hub P and box R, when placed together, are so constructed that a recess, $i$, is formed, into which packing $v$ may be placed, between the hub and disk-plate V and hub P, which are held together by bolts or rivets $w$ $w$.

A friction-plate, $x$, is placed on the end of the axle

U before the disk-plate V is put on, which serves a twofold purpose, viz., to prevent friction on the end of the axle U, and also cover the oil-hole $a$ in the center of the disk-plate V to prevent dirt from entering to the bearing surfaces.

After the axle is placed through the hub I then place a friction-washer or collar, $b$, on the axle next to the hub P, and then place a yielding collar or gasket of rubber, or its equivalent, $c$, between the friction-washer and disk-supporter, which is compressed between the washer $b$ and disk-supporter or hanger K, which forces the washer slightly against the hub P and prevents the dust from entering the hub.

The holes in the disk-bars A A are so arranged that, by removing the two inner disks V V and bolts $fff$, and placing bolts in holes $rrr$, the disk-bars can then be taken up endwise, as shown in dotted lines in fig. 1, which will contract the harrow or implement to allow it to pass between rows in cultivating plants, grapevines, &c., without changing the oblique position of the disks, which would have to be done were the rear ends of the disk-bars brought nearer together, which is a common device in agricultural implements.

Having thus described my invention,

What I claim as new, and desire to secure by Letters Patent, is—

1. The semicircular bar B, to which thills or pole may be attached, in combination with the disk-bars A A and bar C, or its equivalent, to admit of the described adjustment, substantially as set forth.

2. The disk V, in combination with hub P, box R, and axle U, when placed or running obliquely to the line of motion.

3. In combination with disk V, hub P, box R, axle U, the yielding washer $c$, friction-washer $b$, and packing, substantially as and for the purpose set forth.

JOSEPH F. POND.

Witnesses:
ALFRED ELWELL,
J. J. ELWELL.